(12) United States Patent  
Hirota

(10) Patent No.: US 8,379,125 B2
(45) Date of Patent: Feb. 19, 2013

(54) SOLID-STATE IMAGING DEVICE, METHOD FOR DRIVING SOLID-STATE IMAGING DEVICE AND CAMERA SYSTEM

(75) Inventor: Isao Hirota, Kanagawa (JP)

(73) Assignee: Sony Corporation, Tokyo (JP)

( * ) Notice: Subject to any disclaimer, the term of this patent is extended or adjusted under 35 U.S.C. 154(b) by 758 days.

(21) Appl. No.: 12/049,878

(22) Filed: Mar. 17, 2008

(65) Prior Publication Data

US 2008/0239123 A1   Oct. 2, 2008

(30) Foreign Application Priority Data

Mar. 27, 2007   (JP) ................................. 2007-083070

(51) Int. Cl.
*H04N 5/335* (2011.01)
(52) U.S. Cl. ........................................ 348/302; 348/311
(58) Field of Classification Search .................. None
See application file for complete search history.

(56) References Cited

U.S. PATENT DOCUMENTS

| | | | | |
|---|---|---|---|---|
| 4,472,741 A | * | 9/1984 | Takatsu et al. | 348/323 |
| 4,949,183 A | * | 8/1990 | Stevens | 348/323 |
| 5,196,939 A | * | 3/1993 | Elabd et al. | 348/314 |
| 7,379,107 B2 | * | 5/2008 | Parks | 348/294 |
| 2005/0062868 A1 | * | 3/2005 | Shiiba et al. | 348/316 |
| 2009/0284614 A1 | * | 11/2009 | Ikeda | 348/222.1 |

FOREIGN PATENT DOCUMENTS

| | | |
|---|---|---|
| JP | 60-041374 | 3/1985 |
| JP | 10-200819 | 7/1998 |
| JP | 2001-112122 | 4/2001 |

OTHER PUBLICATIONS

Japanese Office Action dated Dec. 20, 2011 for Japanese Application No. 2007-083070.

* cited by examiner

*Primary Examiner* — Luong T Nguyen
(74) *Attorney, Agent, or Firm* — SNR Denton US LLP

(57) ABSTRACT

A solid-state imaging device includes an imaging section having multiple pixels laid out in a matrix form for performing photoelectric conversion and multiple vertical transfer sections that vertically transfer signal charges of the multiple pixels in columns, a control section that controls the transfer, hold and addition of signal charges transferred from each of the vertical transfer sections, at least two horizontal transfer sections that horizontally transfer signal charges output from the control section, and a horizontal-horizontal transfer section that transfers the signal charges of one horizontal transfer section that has received the signal charges transferred from the control section to the other horizontal transfer section.

8 Claims, 20 Drawing Sheets

DIVISIONAL READ-OUT 2ch STRUCTURE WITHOUT HORIZONTAL ADDITION FOR CAMCORDER SYSTEM

DIVISIONAL READ-OUT 2ch STRUCTURE WITH HORIZONTAL 4/4 BINNING FOR DSC SYSTEM

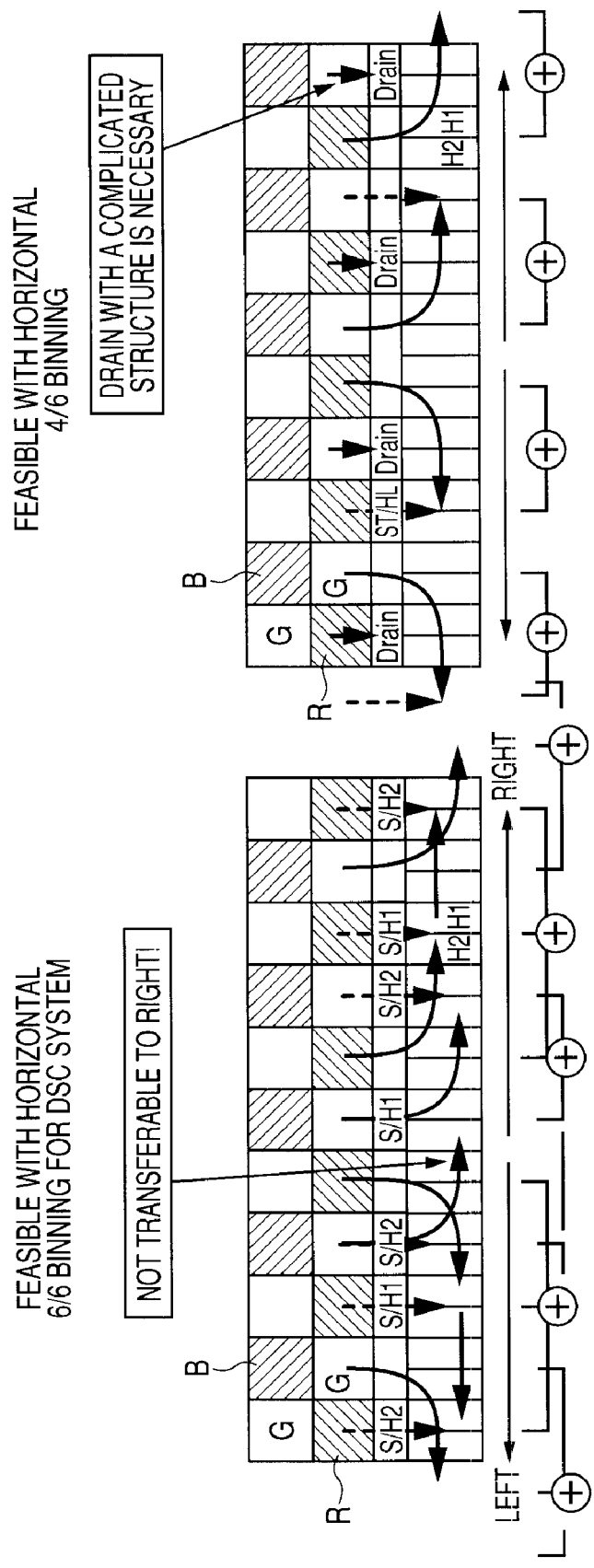

H8/8 BINNING, 1ch OUTPUT
(LOW POWER Live View/AF)

H4/4 BINNING, 3ch OUTPUT
(FULL HD MOVING PICTURE)

H12/12 BINNING, 1ch OUTPUT
(LOW POWER Live View/AF)

● MOVING PICTURE H12/12 ADDITION METHOD
(1/6 DECIMATION AND 12/12 READOUT)

SOLID-STATE IMAGING DEVICE, METHOD FOR DRIVING SOLID-STATE IMAGING DEVICE AND CAMERA SYSTEM

CROSS REFERENCES TO RELATED APPLICATIONS

The present invention contains subject matter related to Japanese Patent Applications JP 2007-083070 filed in the Japanese Patent Office on Mar. 27, 2007, the entire contents of which being incorporated herein by reference.

BACKGROUND OF THE INVENTION

1. Field of the Invention

The present invention relates to a solid-state imaging device, a method for driving a solid-state imaging device and a camera system and, in particular, a charge-transfer type solid-state imaging device typically such as a CCD (Charge Coupled Device) imaging device, a driving method therefor and a camera system.

2. Description of the Related Art

In a solid-state imaging device, charges stored in a valid pixel area are taken out as an electric signal from an output section through a vertical transfer section and a horizontal transfer section. Then, the taken electric signal may be recorded to a recording medium for video or may be directly transferred and reproduced on a television deployed on a receiver side, for example.

A technology for a solid-state imaging device adopting the interlace scan-interline transfer (IS-IT) charge transfer method has been proposed that decimates pixels in the vertical direction in order to improve the readout speed (which will be called frame rate).

In an example of the decimation of pixels in a case of the solid state imaging device with a frame rate of 7.5 frame/sec. for outputting all 1280×960 pixels, in order to attain a frame rate of 30 frame/sec., only one of four pixels in the vertical direction is read out, that is, the compression at a compression rate of ¼, which is the rate for reading out pixels is performed on the pixels in the vertical direction for improvement in frame rate.

This method can perform the compression in the vertical direction but does not allow the compression in the horizontal direction. For that reason, when the pixels in the vertical direction of 1280×960 pixels are compressed at the compression rate ¼, 1280×240 pixels are output from an output section. Therefore, it is difficult to keep the aspect ratio for televisions and deteriorate the horizontal to vertical balance. As a result, the necessity occurs for performing the compression in the horizontal direction to keep the aspect ratio 4:3, and the necessity occurs for performing downstream processing for performing the compression in the horizontal direction at the compression rate ¼.

On the other hand, a technology has been proposed that performs compression in the horizontal direction in a horizontal transfer section by handling adjacent two or more predetermined number of vertical transfer sections as one group, establishing correspondence between the group and a unit transfer bit of a horizontal transfer section and transferring charges from a vertical transfer section to the unit transfer bit (which will be called corresponding unit transfer bit, hereinafter) of the horizontal transfer section corresponding to the group to which the vertical transfer section belongs (refer to JP-A-2002-112122 (Patent Document 1), for example).

SUMMARY OF THE INVENTION

However, the transfer control over charges from vertical transfer sections to a corresponding unit transfer bit since the positional relationships between vertical transfer sections and a corresponding unit transfer bit differ though charges are transferred from the vertical transfer sections in one group to a same corresponding unit transfer bit in the technology including handling adjacent two or more predetermined number of vertical transfer sections as one group, establishing correspondence between the group and a unit transfer bit of a horizontal transfer section and transferring charges from a vertical transfer section to the unit transfer bit of the horizontal transfer section corresponding to the group to which the vertical transfer section belongs, which can stand further improvements.

A horizontal parallel 2-channel structure has been proposed and been put to practical use for a solid state imaging device (or CCD) for high definition (HD) or a solid-state imaging device (or CCD) for progressive scan. This is characterized by having a horizontal-horizontal (HH) transfer structure also including a structure that selects either transfer or hold of a signal of a specific column to the next HCCD between a first horizontal transfer section (first horizontal (H) CCD) and a second horizontal transfer section (second HCCD).

Advantageously, this can eliminate the necessity for a device for a vertical CCD (VCCD) structure, and the configuration may include a newly created parallel horizontal CCD (HCCD) section only.

FIG. 1 is a diagram showing a first configuration example of the transfer output stage of a general CCD adopting the HD 2-channel output method.

FIG. 2 is a diagram showing a second configuration example of the transfer stage of a general CCD adopting the HD 2-channel output method.

FIG. 1 and FIG. 2 are different in that the H-transfer pitch in FIG. 2 is half of that in FIG. 1.

FIGS. 1 and 2 include a pixel array section (imaging section) 1, a control gate section 2, a first horizontal (H) CCD 3, a second horizontal (H) CCD 4 and an HH transfer section 5.

In order to perform signal demultiplexing in the HH transfer section 5 in the configurations in FIGS. 1 and 2, a specific column has a transfer holding channel stop (CS) for holding the transfer by one side, and the column that transfers charges to the horizontal (H) CCD 4 in the next stage has an HH gate with a transfer channel.

This reduces the width of the transfer channel and causes many failures in vertical lines due to the deterioration in HH transfer efficiency, which is not a preferable structure for manufacturing. The increase in length of the HH transfer path for capacity assignment may cause failures in HH transfer. Furthermore, since readout signals Gb and Gr are output from different channels, it is important for a subsequent processing system to perform the channel matching between the readout signals Gb and Gr.

Since the H transfer pitch is ½ in the configuration in FIG. 2, the HH transfer path is further increased for capacity assignment, which may further increase the possibility of occurrence of HH transfer failures.

In order to improve the HH transfer efficiency, it is important to increase the difference between LOW voltage of a first horizontal (H) CCD and HIGH voltage of a second horizontal (H) CCD. Since the voltage difference directly becomes the horizontal transfer clock amplitude of the HCCD, the power consumption of the horizontal CCD driver is disadvantageously increased by the square of the voltage. In other words, the amount of power increases that attempts solving the failure in the vertical lines due to the deterioration in CCD transfer as a result.

In order to solve the problem, a so-called divisional read-out 2-channels (ch) as shown in FIGS. 3A and 3B has been proposed and put into mass production. In the divisional read-out 2-channels, charges are transferred to both sides (left and right sides in FIGS. 3A and 3B) which hold the HH transfer.

However, when the left and right characteristics differ, a height difference is caused at the center, which causes a less-operable structure.

For example, some digital still cameras (DSC) may perform horizontal 6/6 binning. As shown in FIG. 4, the 6/6 and higher binning is difficult since horizontal interlace addition (adding mode that signals existing by every some pixel pitch interval transfer in horizontal register and adding each other) is difficult in the left-right transfer (divisional read-out)2-channels. If 4/6 binning is adopted, the sensitivity may decrease, and the picture quality may be deteriorated with false color, for example.

Accordingly, it is desirable to provide a solid-state imaging device, a method for driving a solid-state imaging device and a camera system, which can improve the transfer efficiency, can be driven with low amplitudes, can increase the horizontal register pitch by M/2 times and can eliminate the necessity for channel matching by allowing the assignment of a horizontal transfer channel to each color.

According to a first embodiment of the invention, there is provided a solid-state imaging device including an imaging section having multiple pixels laid out in a matrix form for performing photoelectric conversion and multiple vertical transfer sections that vertically transfer signal charges of the multiple pixels in columns, a control section that controls the transfer, hold and addition of signal charges transferred from each of the vertical transfer sections, at least two horizontal transfer sections that horizontally transfer signal charges output from the control section, and a horizontal-horizontal transfer section that transfers the signal charges of one horizontal transfer section that has received the signal charges transferred from the control section to the other horizontal transfer section.

Preferably, the horizontal-horizontal transfer section directly transfers signal charges, without performing signal demultiplexing.

Preferably, the horizontal-horizontal transfer section has a structure in which transfer units corresponding to multiple columns of the pixel matrix are aligned in parallel, and a barrier section is provided on the adjacent transfer unit side.

Preferably, the control section processes to allow horizontal binning in the horizontal transfer section.

Preferably, signal demultiplexing is performed on the control section side.

Preferably, (N/2) horizontal transfer sections are provided, and [(N/2)−1] horizontal-horizontal transfer sections are provided to implement N line sequences and N/2 channel output (where N is a positive integer equal to or higher than 4).

According to another embodiment of the invention, there is provided a method for driving a solid-state imaging device having an imaging section having multiple pixels laid out in a matrix form for performing photoelectric conversion and multiple vertical transfer sections that vertically transfer signal charges of the multiple pixels in columns and at least two horizontal transfer sections that horizontally transfer signal charges output from the control section, the method including a first step of controlling the transfer, hold and addition of signal charges transferred from each of the vertical transfer sections before the signal charges are transferred to the horizontal transfer sections and a second step of transferring the signal charges of one horizontal transfer section that has received the signal charges transferred from the control section to the other horizontal transfer section, wherein the second step directly transfers the signal charges, without performing signal demultiplexing.

According to another embodiment of the invention, there is provided a camera system including a solid-state imaging device, an optical system that forms a subject image on the imaging device and a signal processing circuit that processes an output image signal of the imaging device, wherein the solid-state imaging device has an imaging section having multiple pixels laid out in a matrix form for performing photoelectric conversion and multiple vertical transfer sections that vertically transfer signal charges of the multiple pixels in columns, a control section that controls the transfer, hold and addition of signal charges transferred from each of the vertical transfer sections, at least two horizontal transfer sections that horizontally transfer signal charges output from the control section, and a horizontal-horizontal transfer section that transfers the signal charges of one horizontal transfer section that has received the signal charges transferred from the control section to the other horizontal transfer section.

Preferably, the horizontal-horizontal transfer section directly transfers signal charges, without performing signal demultiplexing.

According to the embodiments of the invention, the transfer, hold and addition of signal charges transferred from vertical transfer sections are controlled by the control section before the signal charges are transferred to the horizontal transfer sections.

In a case where the signal charges of one horizontal transfer section that has received the signal charges transferred from the control section are to be transferred to the other horizontal transfer section, the signal charges are directly transferred by the horizontal-horizontal transfer section, without performing signal demultiplexing.

The embodiments of the invention can improve the transfer efficiency, can be driven with low amplitudes, can increase the horizontal register pitch by M/2 times and can eliminate the necessity for channel matching by allowing the assignment of a horizontal transfer channel to each color.

BRIEF DESCRIPTION OF THE DRAWINGS

FIG. 4 is a diagram for describing problems in FIGS. 3A and 3B;

DESCRIPTION OF THE PREFERRED EMBODIMENTS

With reference to drawings, embodiments of the invention will be described below.

Figure 1:
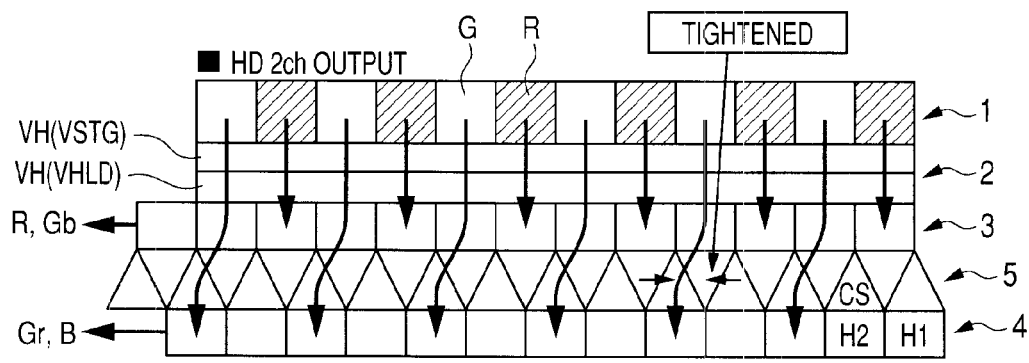
FIG. 1 is a diagram showing a first configuration example of the transfer output stage of a general CCD adopting an HD 2-channel output method.
Figure 2:
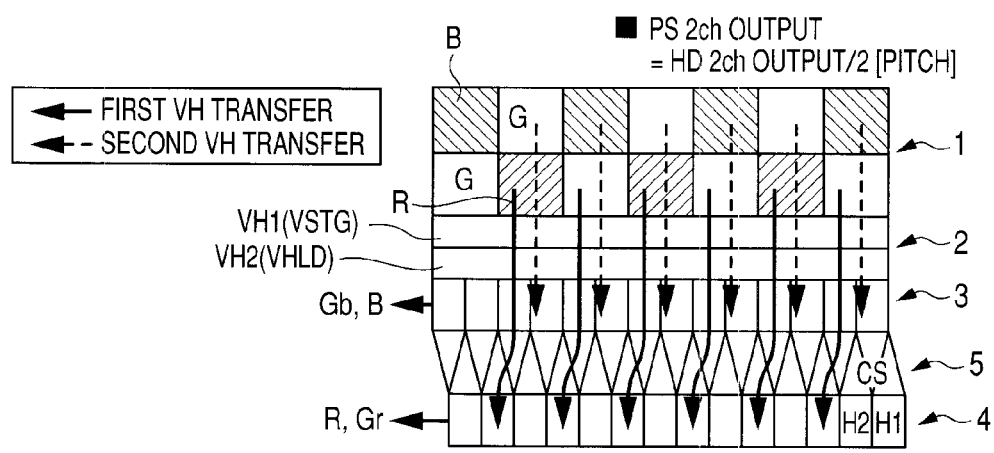
FIG. 2 is a diagram showing a second configuration example of the transfer output stage of a general CCD adopting an HD 2-channel output method.
Figure 3A:
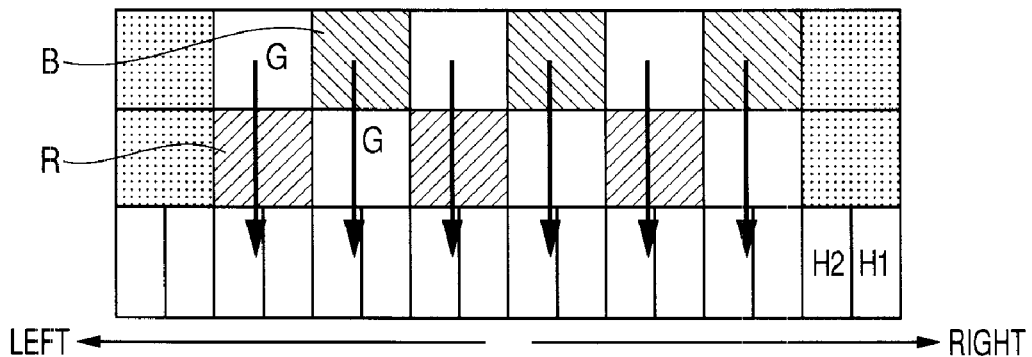
FIGS. 3A and 3B are diagrams showing configuration examples in which charges are transferred to both sides (both left and right sides) to hold the HH transfer.
Figure 3B:
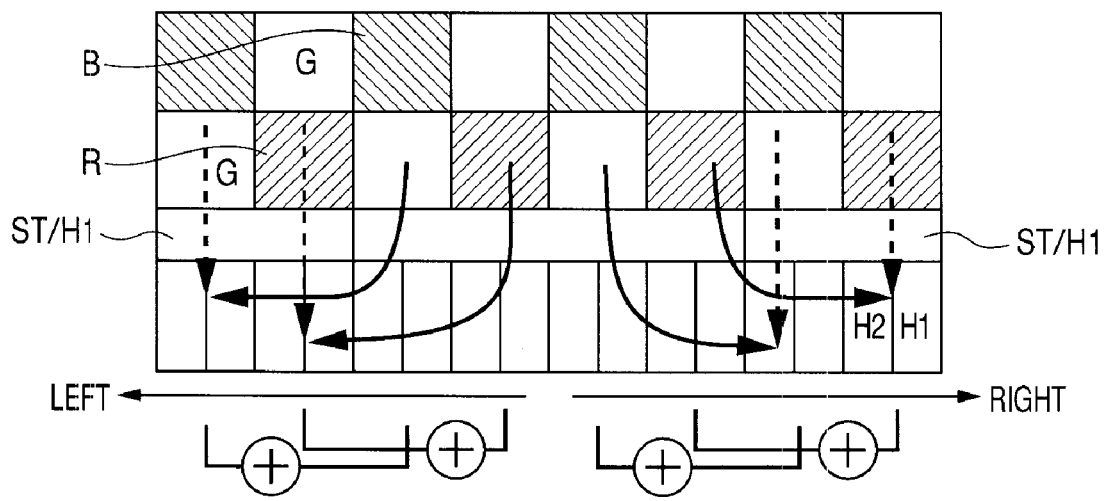
Figure 5:
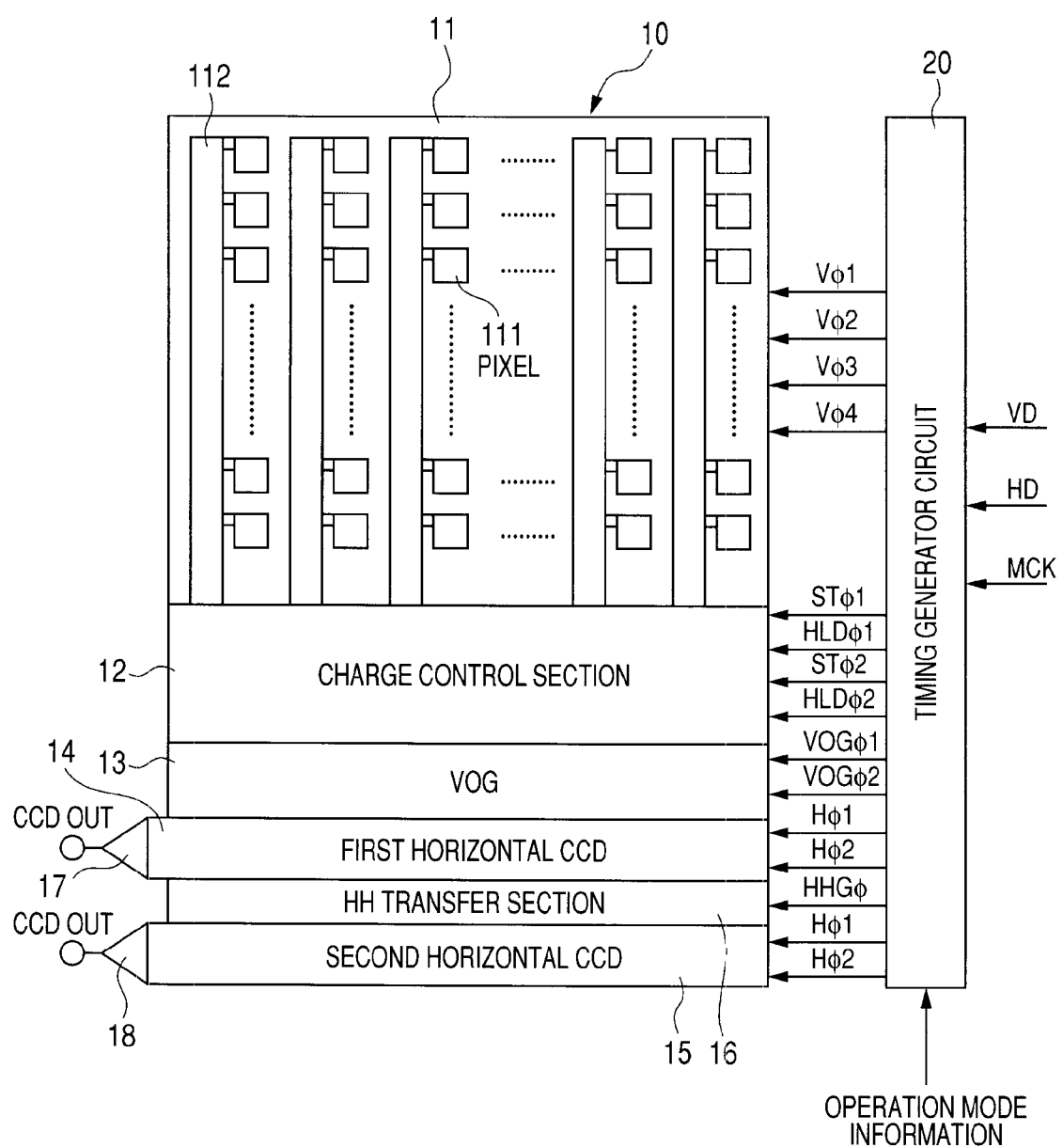
FIG. 5 is a schematic configuration diagram showing the configuration of a charge transfer type imaging device, such as a CCD imaging device, according to an embodiment of the invention.
Figure 6:
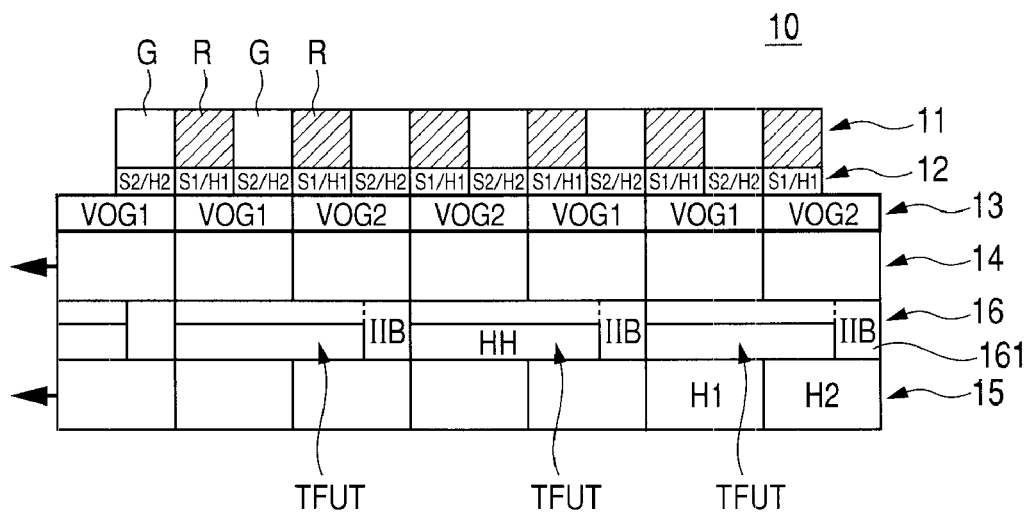
FIG. 6 is a diagram schematically showing a multistage (two-stage according to this embodiment) horizontal transfer system in a parallel structure according to an embodiment of the invention.

FIG. 5 is a schematic configuration diagram showing the configuration of a charge transfer type imaging device, such as a CCD imaging device, according to an embodiment of the invention. FIG. 6 is a diagram schematically showing a multistage (two-stage according to this embodiment) horizontal transfer system in a parallel structure according to an embodiment of the invention.

A CCD imaging device 10 according to an embodiment of the invention has, as shown in FIG. 5, an imaging section 11, a charge control section 12, a vertical output gate section (VOG section) 13, a first horizontal transfer section (horizontal CCD) 14, a second horizontal transfer section (horizontal CCD) 15, a horizontal-horizontal (HH) transfer section 16 and charge-voltage converting sections 17 and 18, each of which operates in response to a timing pulse from a timing generator circuit (TG) 20.

The imaging section 11 includes multiple pixels (light receiving section including a photoelectric converter) 111 and multiple vertical CCDs (vertical transfer sections) 112.

The multiple pixels 111 are laid out in a matrix form and convert incident light to signal charges in an amount of charges corresponding to the quantity of light. The multiple vertical CCDs 112 are laid out in columns against the matrix-form array of the pixels 111 and vertically transfer in columns the signal charges which are photoelectrically converted by the pixels 111 and read out from the pixels 111.

The vertical CCDs 112 are driven to transfer by four-phase vertical transfer clocks $V\phi 1$ to $V\phi 4$, which are supplied from the timing generator circuit 20, and transfer the signal charges readout from the pixels 111 in the vertical direction sequentially in parts each corresponding to one scan line (or one line) in a part of a horizontal blanking period.

The pixel array may adopt Bayer array but is not specifically limited.

The charge control section 12 set in a predetermined operation mode allows the decimation by holding the transfer of charges from vertical CCDs 112 in a predetermined column of multiple columns, which are handled as a unit of multiple vertical CCDs 112, and the addition of the signal charges transferred from the vertical CCDs 112 in the remaining two or more columns of the multiple columns.

The processing is called horizontal (H) binning. The charge control section 12 set in an operation mode excluding the predetermined operation mode further serially converts the alignment of the signal charges transferred in units of multiple columns and in parallel from the multiple vertical CCDs 112, which are then sequentially output.

The charge control section 12 performs the horizontal binning operation by being controlled to drive by control pulses generated by the timing generator circuit 20, that is, storage pulses $ST\phi 1$ and $ST\phi 2$ and hold pulses $HLD\phi 1$ and $HLD\phi 2$.

More specifically, the storage pulse $ST\phi 1$ and hold pulse $HLD\phi 1$ are paired to drive a storage electrode and a hold electrode, which are provided for the vertical CCD 112 in a predetermined column. The storage pulse $ST\phi 2$ and hold pulse $HLD\phi 2$ are paired to drive a storage electrode and a hold electrode, which are provided for the vertical CCD 112 in the next column.

The VOG section 13 transfers (shifts) charges output from the charge control section 12 to the first horizontal CCD 14 in response to control pulses $VOG\phi 1$ and $VOG\phi 2$ by the timing generator circuits 20.

According to this embodiment, the control section includes the charge control section 12 and the VOG section 13, and signal demultiplexing is performed therein. Signal demultiplexing is not performed in the HH transfer section 16 between the first horizontal CCD 14 and the second horizontal CCD 15.

According to this embodiment, the transfer, hold and addition of signals in columns are controlled by the charge control section 12 and the VOG section 13.

The first horizontal CCD 14 sequentially horizontally transfers signal charges shifted from the VOG section 13. The end on the output side of the first horizontal CCD 14 connects to the charge-voltage converting section 17.

The charge-voltage converting section 17 may include a floating diffusion amplifier, for example, and converts signal charges transferred sequentially by the first horizontal CCD 14 to signal voltage and outputs the result (CCDout).

The second horizontal CCD 15 sequentially horizontally transfers signal charges HH-transferred from the HH transfer section 16. The end on the output side of the second horizontal CCD 15 connects to the charge-voltage converting section 18.

The charge-voltage converting section 18 may include a floating diffusion amplifier, for example, and converts signal charges transferred sequentially by the second horizontal CCD 15 to signal voltage and outputs the result (CCDout).

The HH transfer section 16 directly transfers signals to the second horizontal CCD 15, without performing demultiplexing thereon by the first horizontal CCD 14. This can improve the transfer efficiency and allows the driving with low amplitudes.

As shown in FIG. 6, the HH transfer section 16 has a structure in which transfer unit TFUTs corresponding to four columns of the pixel array are aligned in parallel, and a barrier sections (IIB) 161 is provided on the adjacent (the right side in the example in FIG. 6) transfer unit TFUT side for preventing signal leaks between channels.

Figure 7:
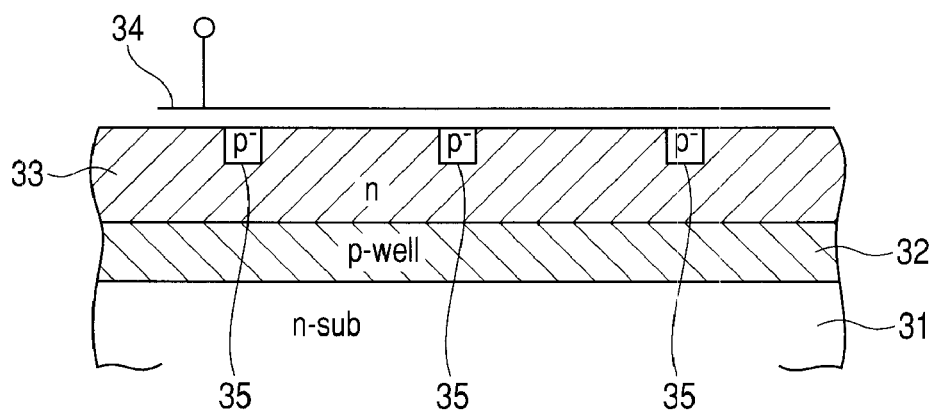
FIG. 7 is a section view showing a configuration example of the HH transfer section according to an embodiment of the invention.

FIG. 7 is a section diagram showing a configuration example of the HH transfer section according to an embodiment of the invention.

The HH transfer section 16 includes, as shown in FIG. 7, a transfer channel 33 and transfer electrodes 34. The transfer channel 33 contains an n-type impurity and is provided on an n-type substrate 31 through a p-type well 32. The transfer electrodes 34 are aligned repetitively in the direction of transfer above the transfer channel 33.

A p$^-$-type impurity layer 35 is provided on the surface side of the transfer channel 33 under the transfer electrodes 34. The p$^-$ type impurity layer 35 functions as the barrier section 161.

As described above, the CCD imaging device 10 is driven by a timing signal generated by the timing generator circuit 20.

The timing generator circuit 20 generates timing signals in timing relationship according to the externally supplied imaging mode information, such as four-phase vertical transfer pulses V$\phi$1 to V$\phi$4, which drive the vertical CCDs 112, storage pulses ST$\phi$1 and ST$\phi$2 and hold pulses HLD$\phi$1 and HLD$\phi$2, which drive the charge control section 12, pulses VOG$\phi$1 and VOG$\phi$2, which drive the VOG section 13, two-phase horizontal transfer pulses H$\phi$1 and H$\phi$2, which drive the first horizontal CCD 14 and second horizontal CCD 15 and a pulse HHG$\phi$, which drives the HH transfer section 16, based on a vertical synchronous signal VD, a horizontal synchronous signal HD and a master clock MCK.

The imaging mode information may contain a still-picture imaging mode (for still picture independent readout (with horizontal 4 line (H4) sequences and 2 ch/1 ch output)), an operational imaging mode (for full-HD moving pictures (with horizontal four lines (H4)/4 binning and 2 ch output)) and a low power mode (for low power live view/AF (with horizontal 8 lines (H8)/8 binning and 1 ch output), for example.

Next, operations by the CCD imaging device 10 in the configuration above will be described step by step with reference to cases for still picture independent readout and H 4/4 binning and H 8/8 binning in horizontal four line sequences and two channel or one channel output and horizontal six line sequences and three channel output, for example.

[Still Picture Independent Readout]

First of all, an operation for a still picture independent readout will be described with reference to FIGS. 8, 9 and 10.

Figure 8:
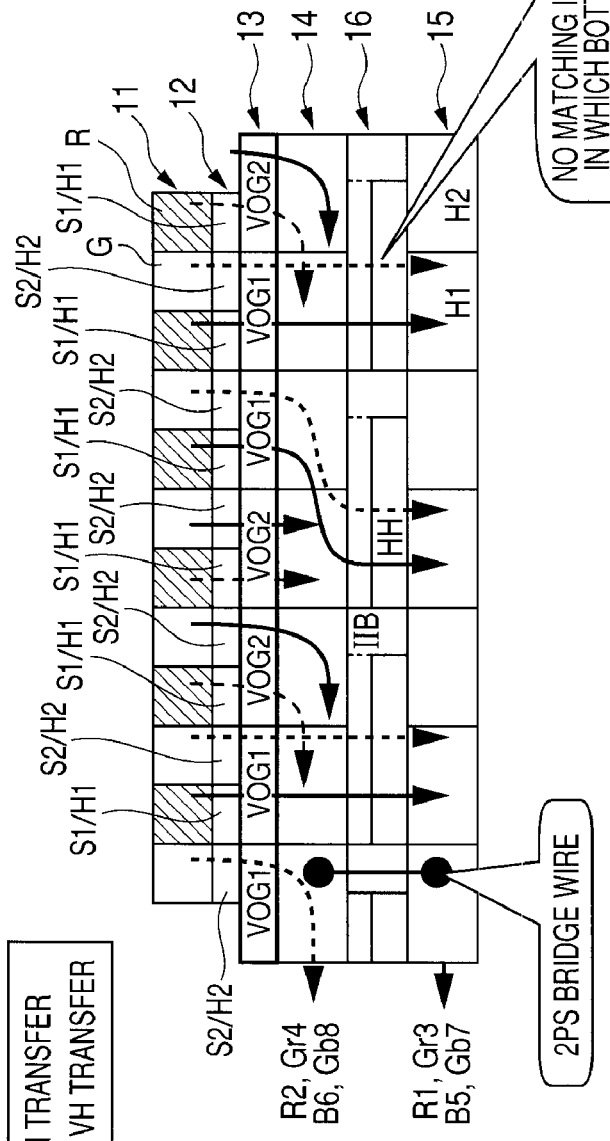
FIG. 8 is a diagram schematically showing a still picture readout operation.

FIG. 8 is a diagram schematically showing a still picture readout operation. FIG. 9 is a timing chart for the still picture readout operation. FIG. 10 is a diagram showing the details of an addition operation in the still picture readout operation.

In a case of the still picture independent operation, charges for one vertical (V) line are horizontally transferred at two or four times.

Figure 9:
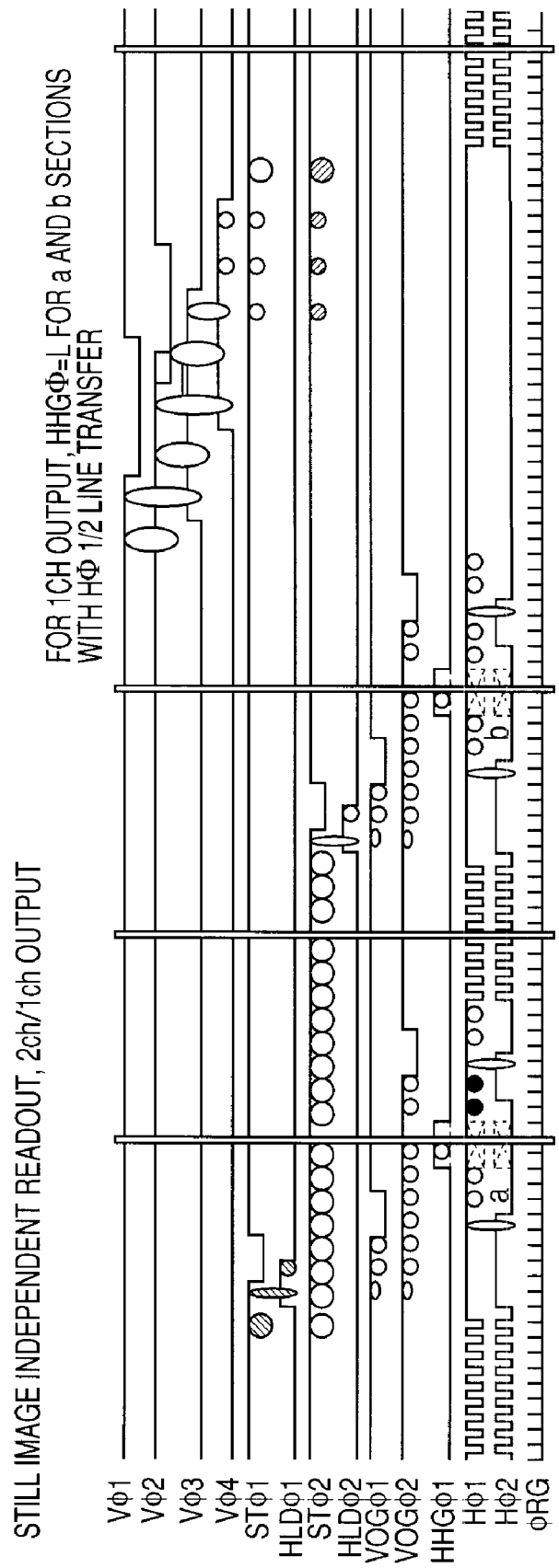
FIG. 9 is a timing chart for a still picture readout operation.
Figure 10:
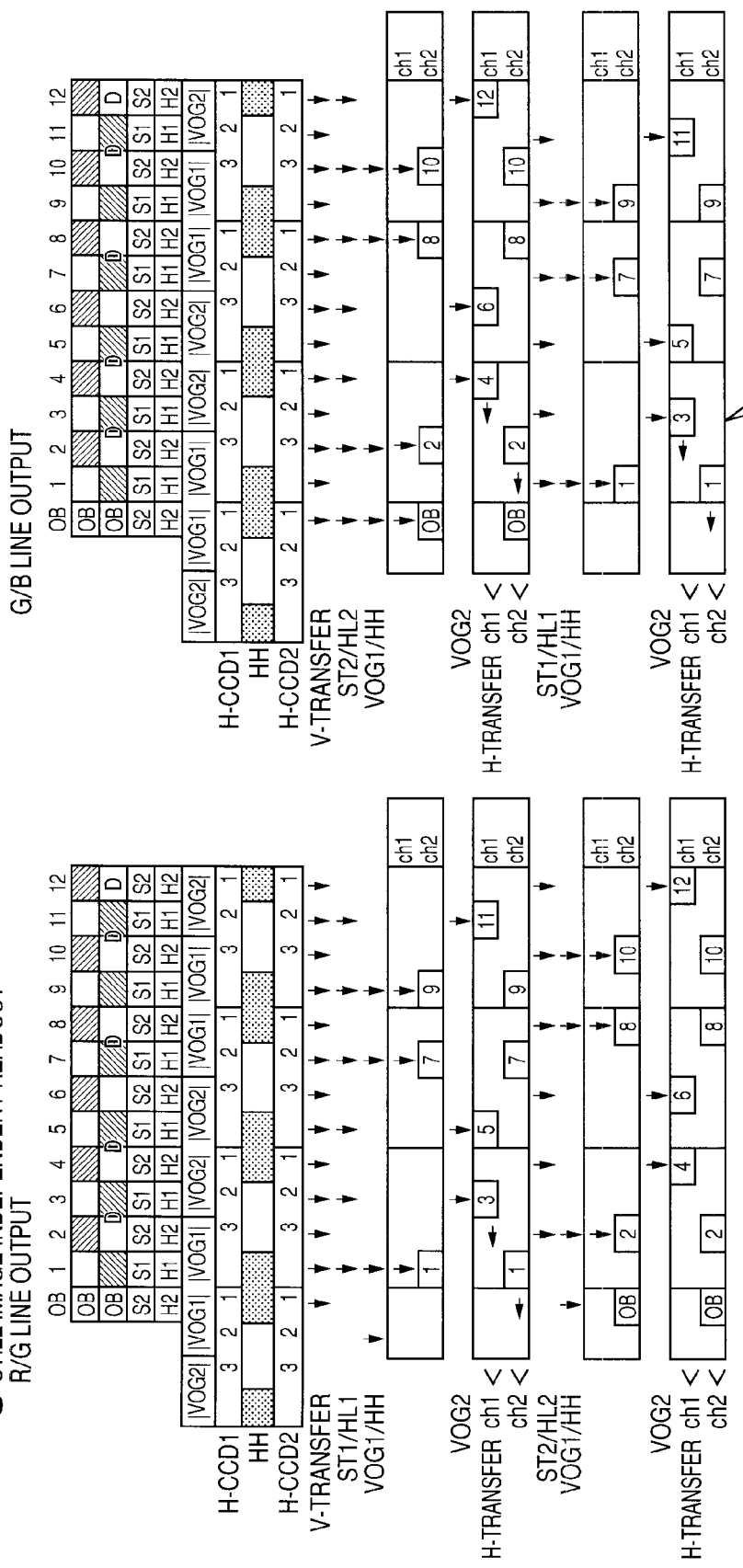
FIG. 10 is a diagram showing details of an addition operation in a still picture readout operation.

For example, as shown in FIGS. 8 to 10, a signal of each one of four columns of the R columns only of R (red) and G (green) lines is controlled in demultiplexing in the charge control section 12 and VOG section 13 between the vertical and horizontal (VH) sections and are transferred to the first horizontal CCD 14.

The horizontal transfer and signal output are performed here in order to use the output one channel (ch) only in order to eliminate the necessity for the matching between channels.

In order to increase the frame rate with output two channels even by performing characteristic matching, the signals are transferred to the second horizontal CCD 15 in the next stage through the HH transfer section 16 under the HH transfer control based on the transfer pulse HHG$\phi$.

After that, the R-column signal of remaining one of the four columns is transferred to the first horizontal CCD 14 and is output through the horizontal transfer.

The remaining G-signals of the same columns are VH-transferred at two sequences in the same manner and are output through serial two or parallel one H-transfers.

The same is true in the GB lines of the next line.

Gb and Gr can be output from different channels in the series of operations with the two channel output.

[H 4/4 Binning]

Figure 12:
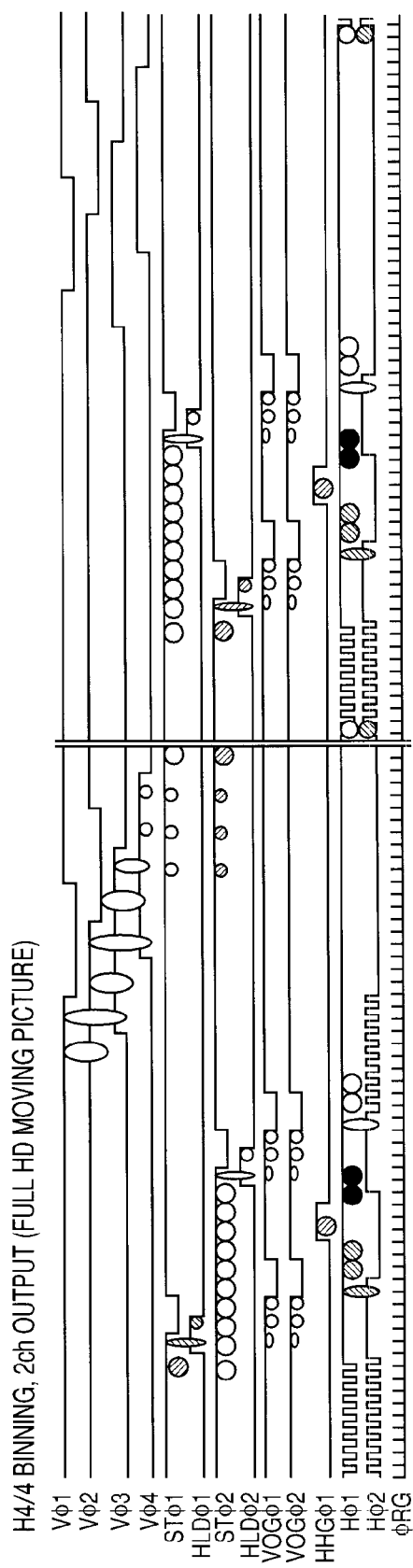
FIG. 12 is a timing chart for the H 4/4 binning operation.
Figure 13:
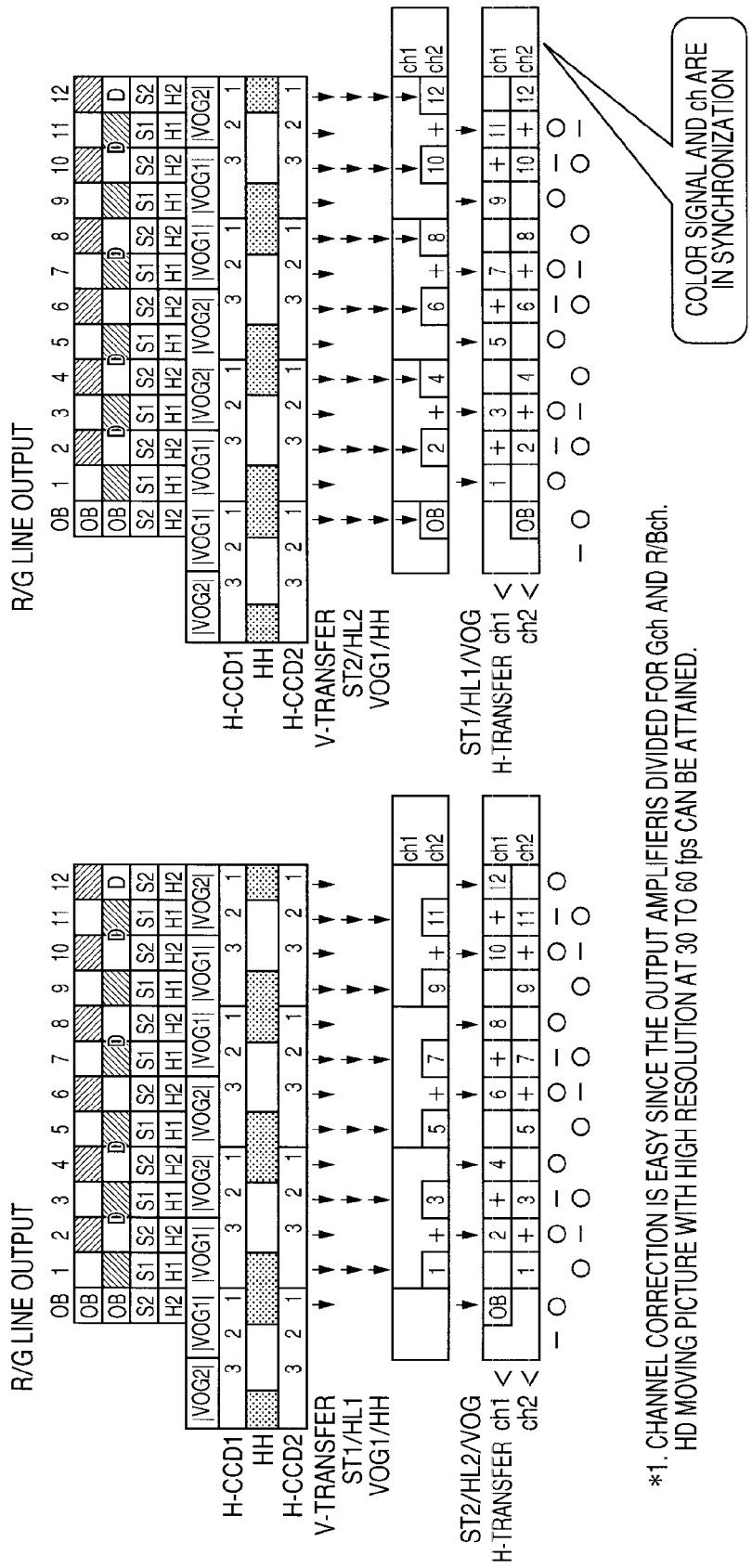
FIG. 13 is a diagram showing details of the addition operation in the H 4/4 binning.

Next, the H 4/4 binning operation will be described with reference to FIGS. 11, 12 and 13.

Figure 11:
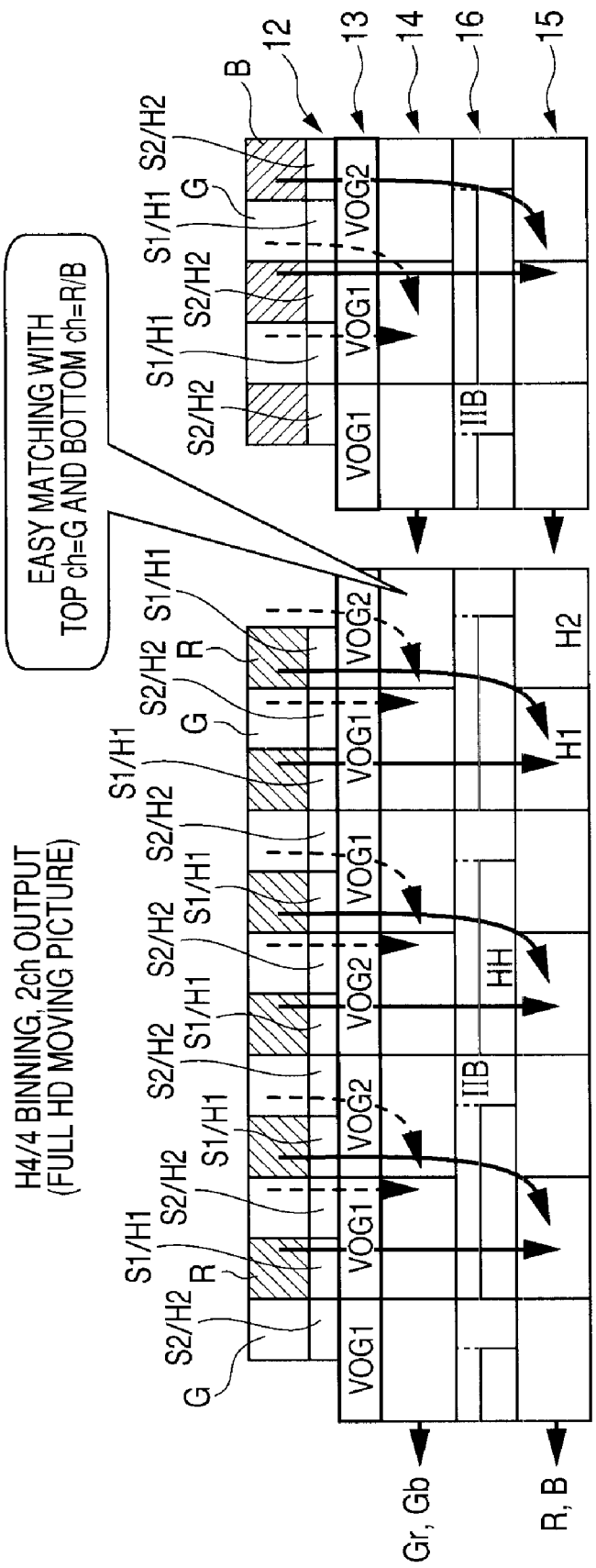
FIG. 11 is a diagram schematically showing an H 4/4 binning operation.

FIG. 11 is a diagram schematically showing the H 4/4 binning operation. FIG. 12 is a timing chart for the H 4/4 binning operation. FIG. 13 is a diagram showing details of the addition operation in the H 4/4 binning.

A digital still camera (DSC) generally adopts a method that decimates and adds identical color signals to reproduce 5 to 10 mega pixels (Mpixels) to an NTSC/PAL liquid crystal device.

The H (horizontal) 4/4 binning is suitable for high-resolution moving pictures or high-frame rate still pictures.

In an example of the RG lines, adjacent R-signals of all of R-signals transferred to the first horizontal CCD 14 first are added in the first horizontal CCD 14 under the control of the charge control section 12 and VOG section 13 since the horizontal CCD handles four columns as one packet.

This is directly transferred to the next second horizontal CCD 15 as it is through the HH transfer section 16 under the HH transfer control based on the transfer pulse HHG$\phi$. Then, G-signals are transferred to the first horizontal CCD 14 in the same manner.

After that, the first horizontal CCD 14 and second horizontal CCD 15 perform the horizontal (H) transfer, and the R and G signals are output from 2 chs.

In this case, the difference between the left and right sides does not occur as in the left and right transfer (divisional read-out transfer) since the color signals are output from different channels. The offset difference between the channels is absorbed by the OB clamp, and the gain difference is absorbed by the white balance since it is the same as the difference in color sensitivity.

[H 8/8 Binning]

Figure 15:
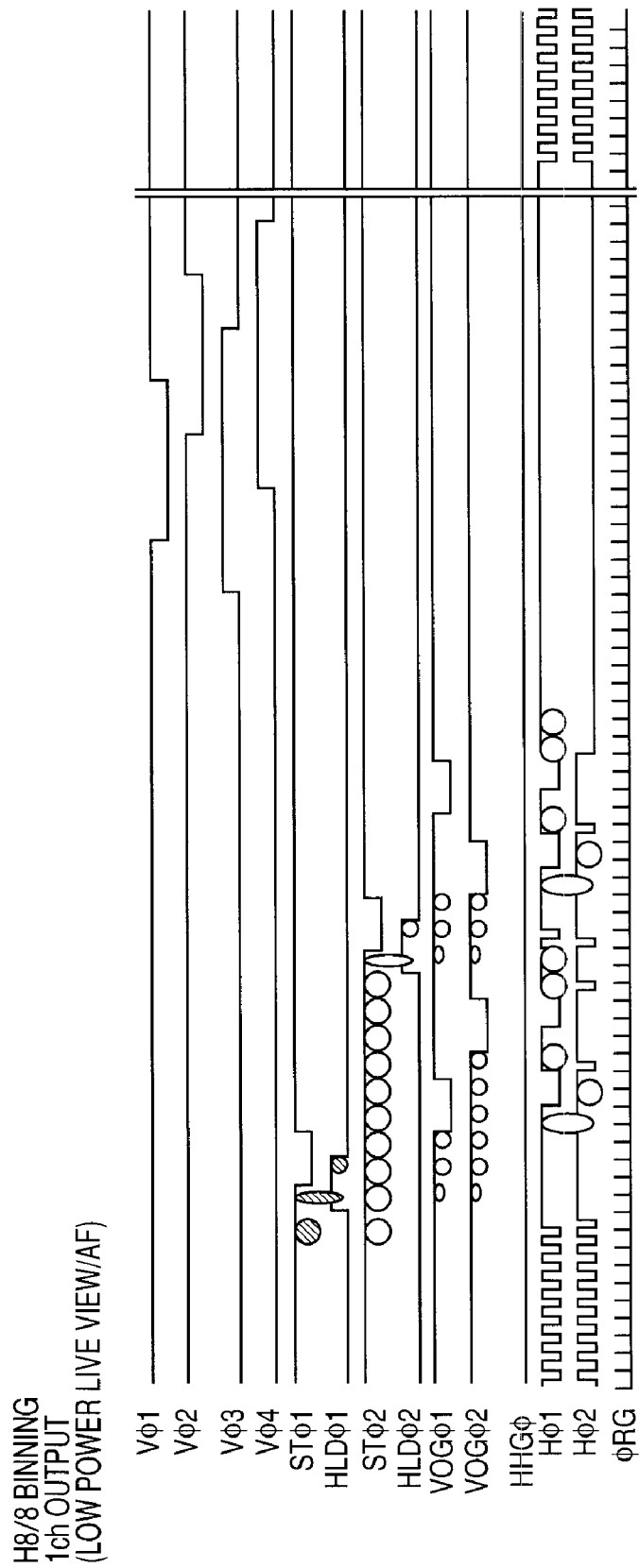
FIG. 15 is a timing chart for the H 8/8 binning operation.
Figure 16:
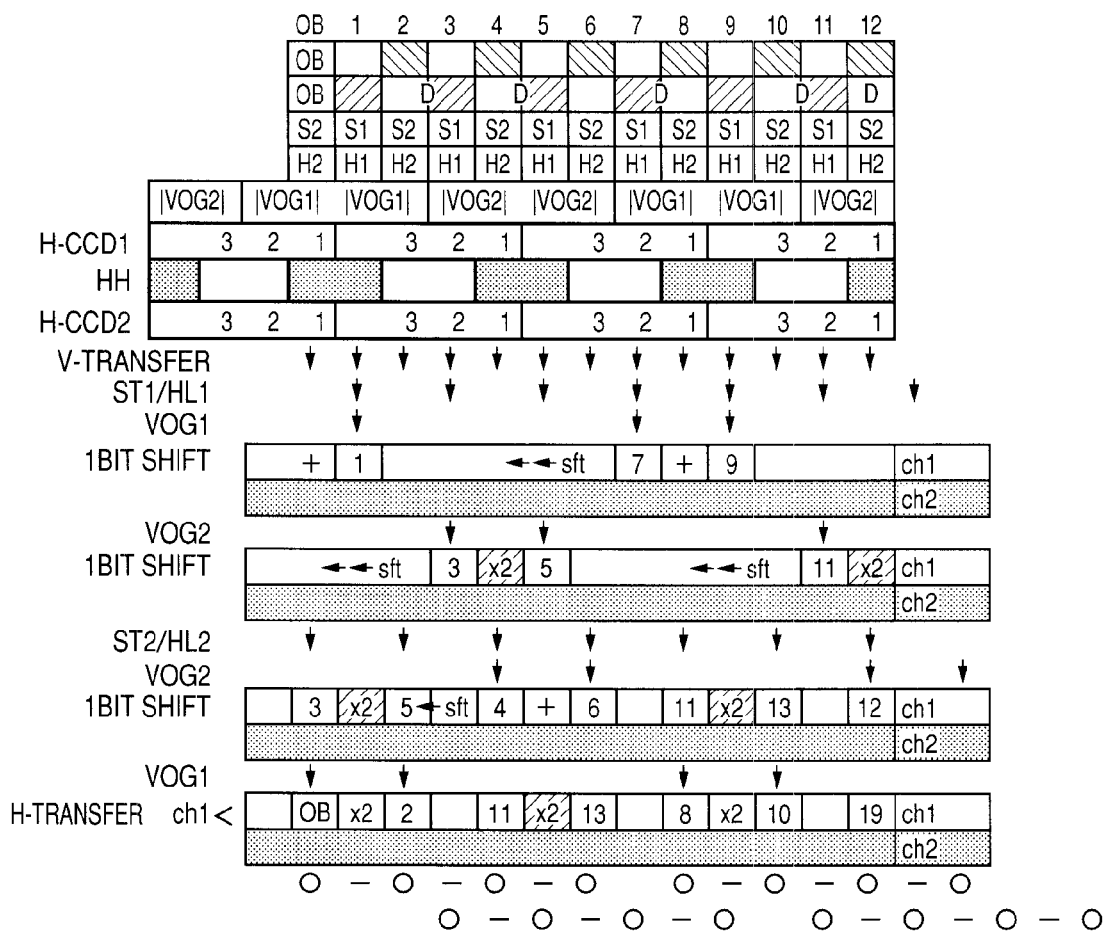
FIG. 16 is a diagram showing details of the addition operation in the H 8/8 binning.

Next, the H 8/8 binning operation will be described with reference to FIGS. 14, 15 and 16.

Figure 14:
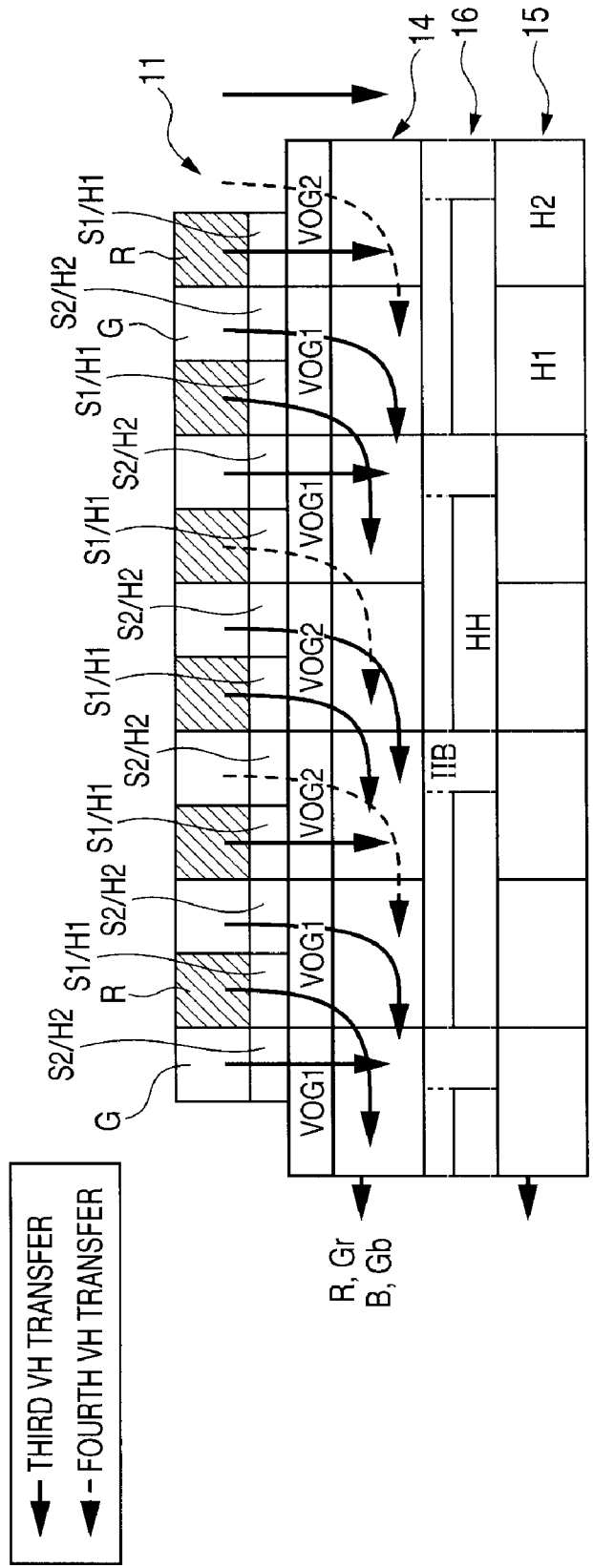
FIG. 14 is a diagram schematically showing an H 8/8 binning operation.

FIG. 14 is a diagram schematically showing the H 8/8 binning operation. FIG. 15 is a timing chart for the H 8/8 binning operation. FIG. 16 is a diagram showing details of the addition operation in the H 8/8 binning.

This is an operation mode that can achieve low power by stopping the operation of one channel since 1 ch output is allowed though the frame rate is equal to that of the H 4/4 binning operation.

A signal for one pixel for one color of every four columns in the RG lines is VH-transferred, and signals of adjacent two pixels are added within the first horizontal CCD 14 under the control of the charge control section 12 and VOG section 13.

After that, the first horizontal CCD 14 is shifted by one bit, and the remaining R-signals are VH-transferred and added for four pixels in total.

The HCCD has an empty packet every other bit, and the same operation sequence is next performed to add G-signals for four pixels.

As a result, the H 8/8 binning is allowed through 1 ch.

Having described the case with the horizontal four line sequences and 2 ch/1 ch output basically, for example, the case uses two horizontal CCDs and one HH transfer section between the stages.

The invention is not limited to the configuration but is applicable to cases with horizontal 6 line sequences and 3 ch output or horizontal 8 line sequences and 4 ch output, for example.

The case with the horizontal 6 line sequences and 3 ch output uses three horizontal CCDs and one HH transfer section each among the stages.

The case with the horizontal 8 line sequences and 4 ch output uses four horizontal CCDs and one HH transfer section each among the stages.

In this way, a case with horizontal N line sequences and N/2 ch output uses (N/2) horizontal CCDs and [(N/2)−1] HH transfers basically (where N is a positive integer equal to or higher than 4).

FIGS. 17 to 23 show examples with the horizontal 6 line sequences and 3 ch output.

Figure 17:
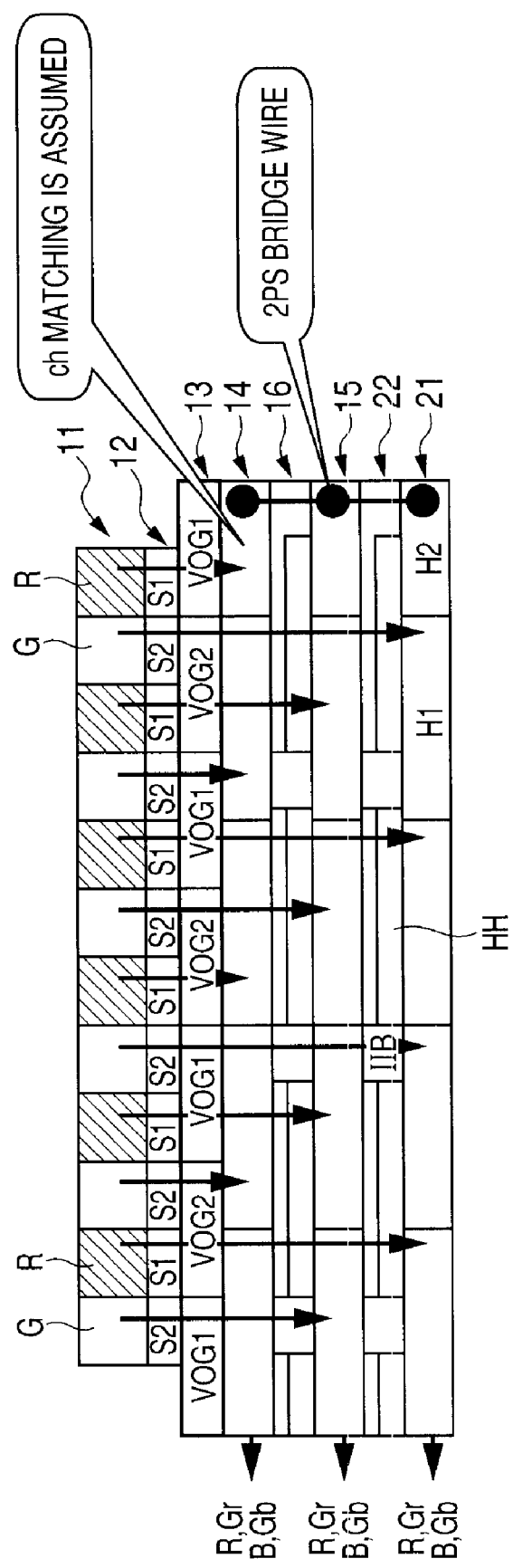
FIG. 17 is a diagram schematically showing a still picture readout operation with horizontal 6 line sequences and 3-ch output.
Figure 18:
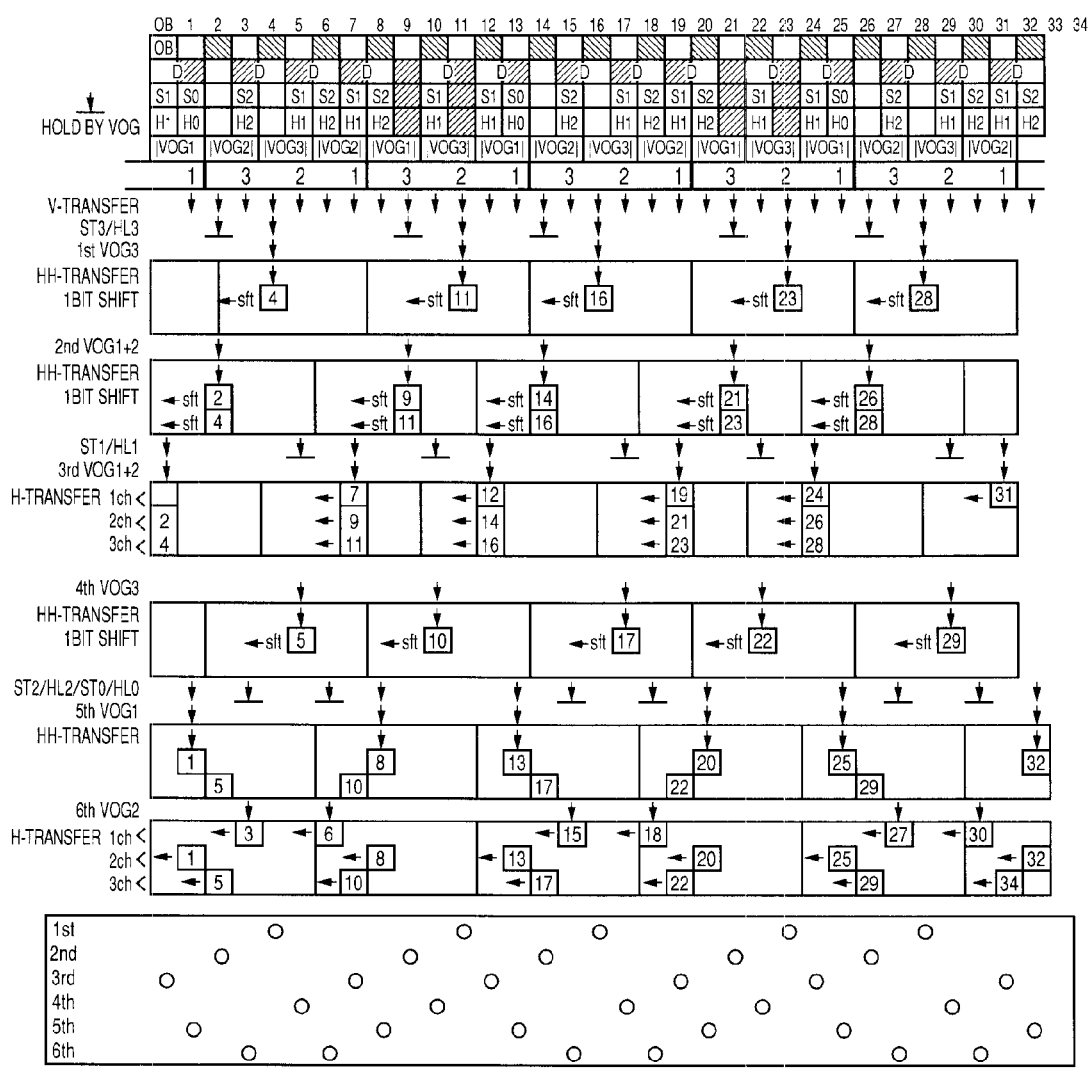
FIG. 18 is a diagram showing details of the addition operation in the still picture readout operation with horizontal 6 line sequences and 3-ch output.

FIG. 17 is a diagram schematically showing the still picture readout operation with horizontal 6 line sequences and 3-ch output. FIG. 18 is a diagram showing details of the addition operation in the still picture readout operation with horizontal 6 line sequences and 3-ch output.

Figure 19:
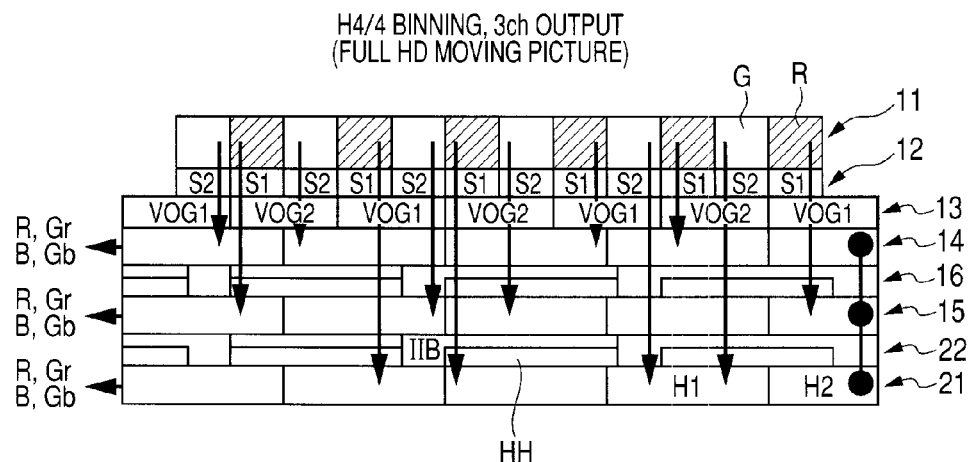
FIG. 19 is a diagram schematically showing the H 4/4 binning with horizontal 6 line sequences and 3-ch output.
Figure 20:
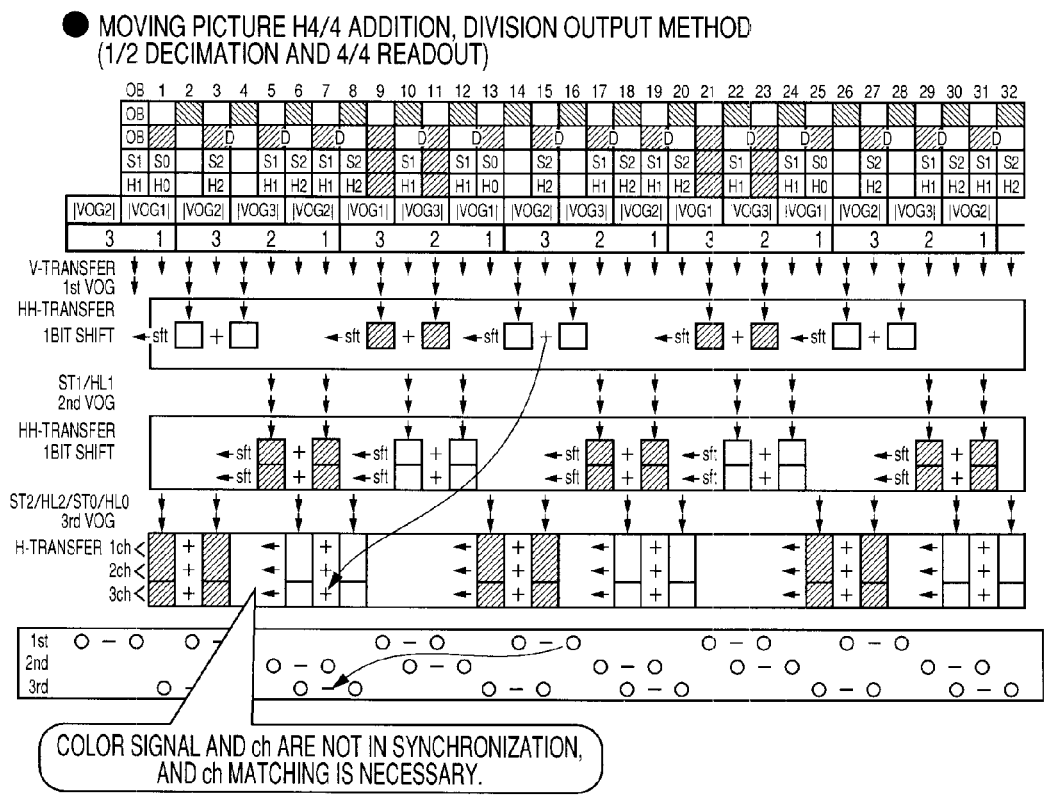
FIG. 20 is a diagram showing details of the addition operation in the H 4/4 binning with horizontal 6 line sequences and 3-ch output.

FIG. 19 is a diagram schematically showing the H 4/4 binning with horizontal 6 line sequences and 3-ch output. FIG. 20 is a diagram showing details of the addition operation in the H 4/4 binning with horizontal 6 line sequences and 3-ch output.

Figure 21:
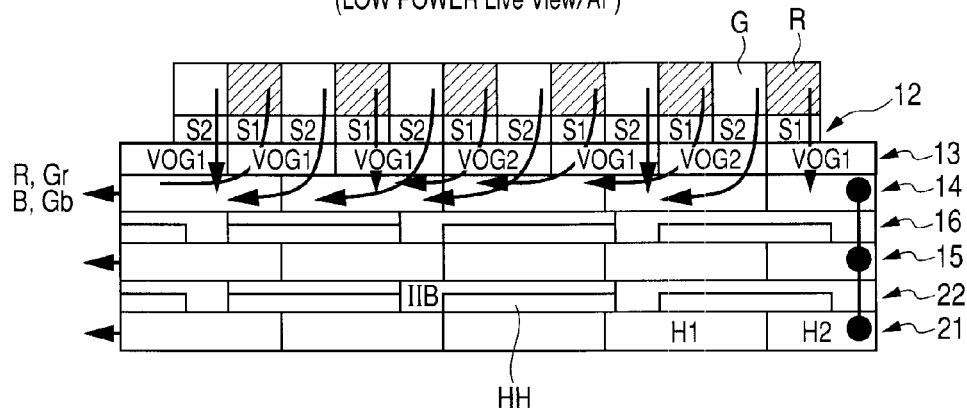
FIG. 21 is a diagram schematically showing an H 8/8 binning operation with horizontal 6 line sequences and 1-ch output.
Figure 22:
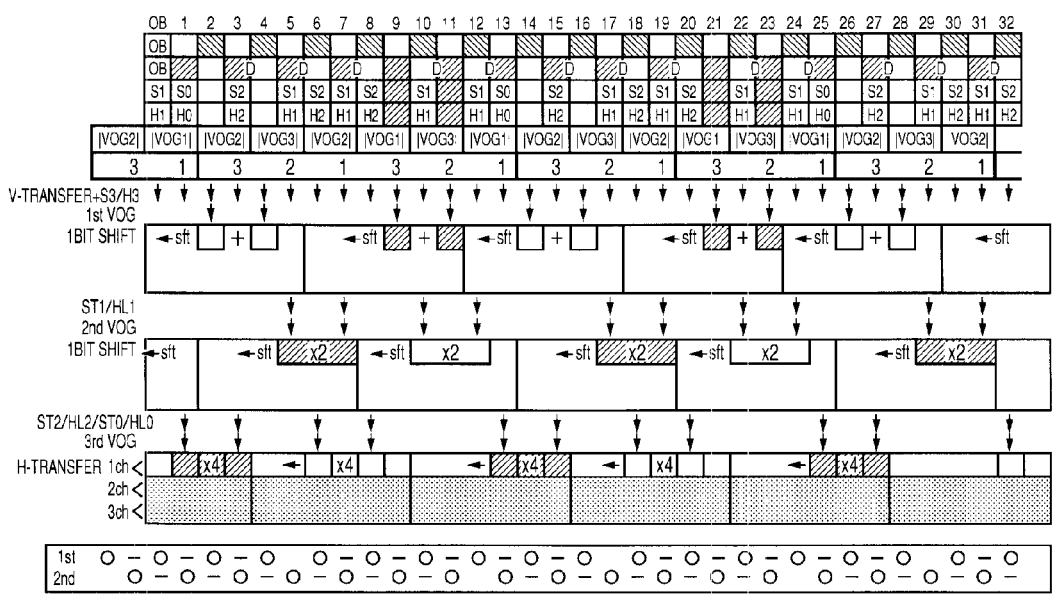
FIG. 22 is a diagram showing details of the addition operation in the H 8/8 binning with horizontal 6 line sequences and 1-ch output.

FIG. 21 is a diagram schematically showing the H 8/8 binning operation with horizontal 6 line sequences and 1-ch output. FIG. 22 is a diagram showing details of the addition operation in the H 8/8 binning with horizontal 6 line sequences and 1-ch output.

Figure 23:
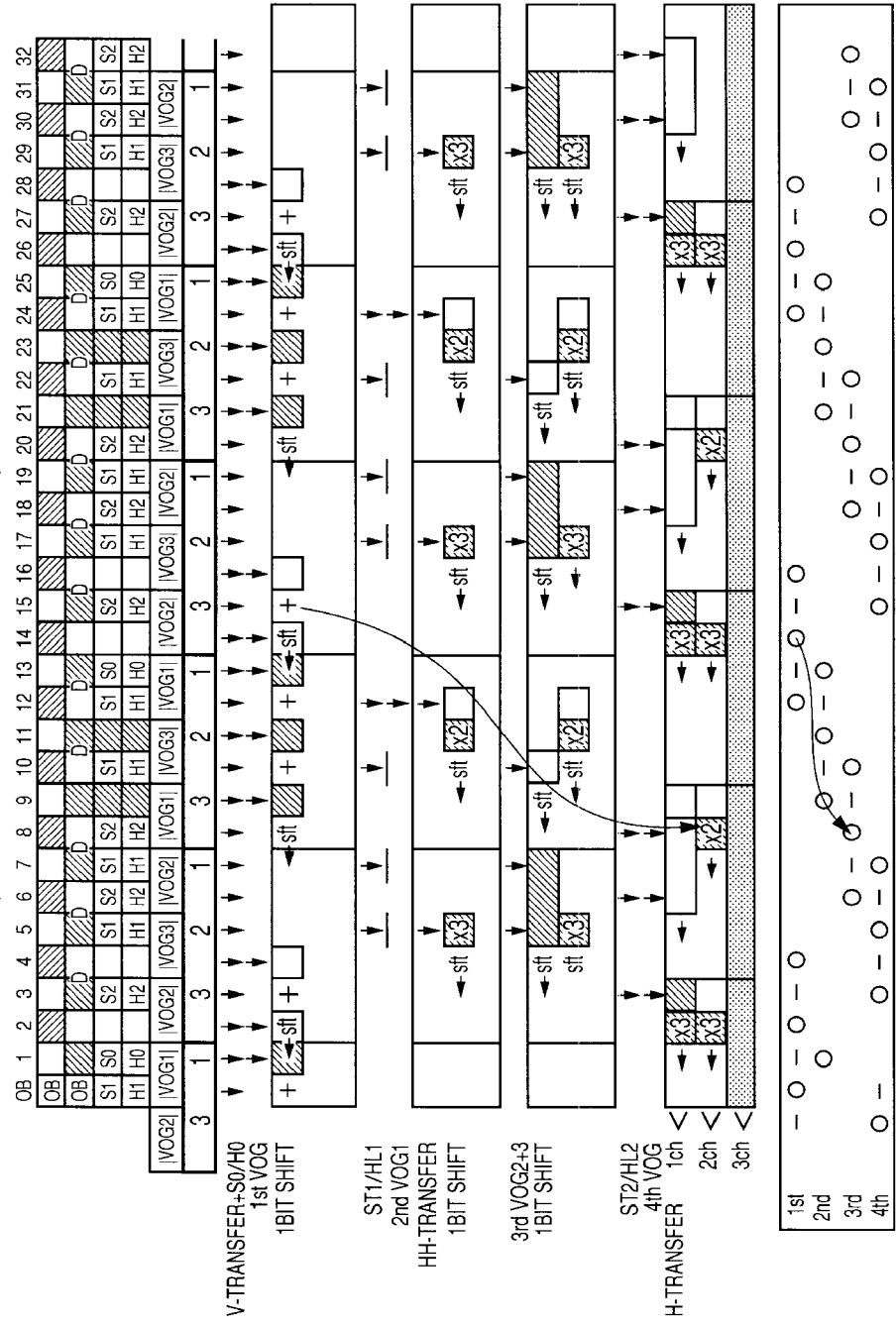
FIG. 23 is a diagram showing details of the addition operation in the H 6/6 binning with horizontal 6 line sequences and 2-ch output.

FIG. 23 is a diagram showing details of the addition operation in the H 6/6 binning with horizontal 6 line sequences and 2-ch output.

Detail descriptions on the basic operation will be omitted here since it is performed in the same manner as the case with the horizontal 4 line sequences and 2 ch/1 ch output. However, it should be noted that it is important to perform channel matching correction since it is difficult to demultiplex color signals for each channel. The present technical level has no problem for performing offset, gain and nonlinearity correction by 3 ch through a digital signal processing.

According to embodiments of the invention, signals are transferred straight in the solid-state imaging device 10 having multistage horizontal transfer sections in a parallel structure by performing signal demultiplexing in the parallel charge control section 12 and VOG section 13, without performing signal demultiplexing in the HH transfer section 16 between the first horizontal CCD 14 and the second horizontal CCD 15, as described above. Thus, the transfer efficiency can be improved, and the driving can be achieved with low amplitudes.

Therefore, a multi-pixel CCD with multi-channel output can be produced easily, and a high definition and high-speed camera can be implemented.

In particular, the double sequences (at the quadruple binning rate) of horizontal coding allow performing color separation for each channel and can eliminate the necessity for matching between channels. Thus, high quality images and high operability can be provided.

The solid-state imaging device having those effects is applicable as an imaging device for a digital camera or a video camera.

Figure 24:
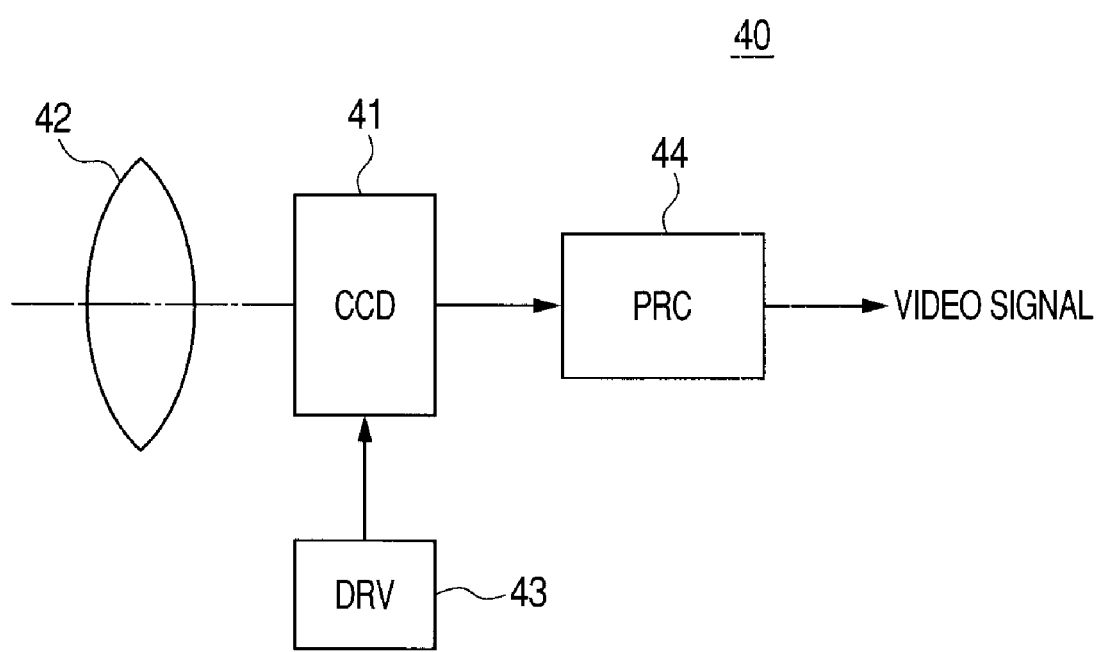
FIG. 24 is a diagram showing an example of the configuration of a camera system to which a solid-state imaging device according to an embodiment of the invention is applicable.

FIG. 24 is a diagram showing an example of the configuration of a camera system to which a solid-state imaging device according to an embodiment of the invention is applicable.

A camera system 40 includes, as shown in FIG. 24, an imaging device 41 to which the solid-state imaging device 10 according to an embodiment of the invention is applicable, a lens 42, a driving circuit (DRV) 43 and a signal processing circuit (PRC) 44. The lens 42 is an optical system that guides incident light to a pixel area of the imaging device 41, that is, forms the image of incident light (image light) on an imaging plane, for example. The driving circuit (DRV) 43 drives the imaging device 41. The signal processing circuit (PRC) 44 processes output signals from the imaging device 41.

The driving circuit 43 has a timing generator (not shown) 20 that generates timing signals including start pulses and clock pulses that drive a vertical CCD, a horizontal CCD and so on and drives the imaging device 41 with a predetermined timing signal.

The signal processing circuit 44 performs signal processing such as CDS (Correlated Double Sampling) and A (analog)/D (digital) conversion on the output signal from the imaging device 41.

The image signal processed by the signal processing circuit 44 is recorded on a recording medium such as a memory. The image information recorded on a recording medium may be hard-copied by a printer, for example. The image signal processed by the signal processing circuit 44 may be shown on a monitor of a liquid crystal display, for example, as moving pictures.

As described above, a high definition and high speed camera can be implemented by installing the CCD imaging device 10 as an imaging device 41 in the imaging apparatus such as a digital still camera.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
an imaging section having (a) multiple pixels in a matrix and that perform photoelectric conversion, and (b) multiple vertical transfer sections that vertically transfer signal charges of the multiple pixels in columns;
a control section that controls the transfer, holding, and addition of signal charges transferred thereto from each of the vertical transfer sections;
at least two horizontal transfer sections that horizontally transfer signal charges output from the control section; and
a horizontal-horizontal transfer section that transfers the signal charges from one horizontal transfer section that has received the signal charges transferred thereto from the control section to the other horizontal transfer section, wherein, the horizontal-horizontal transfer section includes a plurality of transfer units aligned in parallel and a plurality of barrier sections, each of which is provided between adjacent transfer units, each barrier section is a $p^-$ type impurity layer at a surface side of a transfer channel, and each of the plurality of transfer units transfers signal charges of a plurality of columns of the pixels in the matrix.

2. The solid-state imaging device according to claim 1, wherein the horizontal-horizontal transfer section directly transfers the signal charges without performing signal demultiplexing.

3. The solid-state imaging device according to claim 1, wherein signal demultiplexing is performed in the control section.

4. The solid-state imaging device according to any one of claims 1, 2, and 3, wherein (N/2) horizontal transfer sections are provided, and [(N/2)-1] horizontal-horizontal transfer sections are provided to implement N line sequences and N/2 channel output (where N is a positive integer equal to or higher than 4).

5. A camera system comprising:

a solid-state imaging device;

an optical system that forms a subject image on the solid-state imaging device; and a signal processing circuit that processes an output image signal of the solid-state imaging device, wherein, the solid-state imaging device has an imaging section having multiple pixels in a matrix and that perform photoelectric conversion and multiple vertical transfer sections that vertically transfer signal charges of the multiple pixels in columns, a control section that controls the transfer, holding, and addition of signal charges transferred thereto from each of the vertical transfer sections, at least two horizontal transfer sections that horizontally transfer signal charges output from the control section, a horizontal-horizontal transfer section that transfers the signal charges from one horizontal transfer section that has received the signal charges transferred thereto from the control section to the other horizontal transfer section, and that includes a plurality of transfer units aligned in parallel and a plurality of barrier sections, each of which is provided between adjacent transfer units, each barrier section is a $p^-$ type impurity layer at a surface side of a transfer channel, and each of the plurality of transfer units transfers signal charges of a plurality of columns of the pixels in the matrix.

6. The camera system according to claim 5, wherein the horizontal-horizontal transfer section directly transfers the signal charges without performing signal demultiplexing.

7. The solid-state imaging device according to claim 1, wherein each of the plurality of transfer units transfers signal charges of four columns of the pixels in the matrix.

8. The camera system according to claim 5, wherein each of the plurality of transfer units transfers signal charges of four columns of the pixels in the matrix.

* * * * *